(12) United States Patent
Zhang (10) Patent No.: US 9,591,055 B2
(45) Date of Patent: Mar. 7, 2017

(54) METHOD, APPARATUS AND SYSTEM FOR REMOTELY CONTROLLING ELECTRONIC APPARATUS

(71) Applicant: Wistron Corporation, New Taipei (TW)

(72) Inventor: Ying-Ting Zhang, New Taipei (TW)

(73) Assignee: Wistron Corporation, New Taipei (TW)

(*) Notice: Subject to any disclaimer, the term of this patent is extended or adjusted under 35 U.S.C. 154(b) by 301 days.

(21) Appl. No.: 13/886,271

(22) Filed: May 3, 2013

(65) Prior Publication Data

US 2014/0215009 A1 Jul. 31, 2014

(30) Foreign Application Priority Data

Jan. 31, 2013 (CN) .......................... 2013 1 0039507

(51) Int. Cl.
*G06F 15/16* (2006.01)
*H04L 29/08* (2006.01)

(52) U.S. Cl.
CPC ................................ *H04L 67/025* (2013.01)

(58) Field of Classification Search
CPC .................................................... H04L 67/025
See application file for complete search history.

(56) References Cited

U.S. PATENT DOCUMENTS

| | | | | |
|---|---|---|---|---|
| 7,583,686 B2 * | 9/2009 | Shitano | ............... | H04L 12/2803 370/401 |
| 7,739,411 B2 | 6/2010 | Messer et al. | | |
| 2003/0035424 A1 | 2/2003 | Abdollahi et al. | | |
| 2003/0147388 A1 | 8/2003 | Jinag et al. | | |
| 2004/0005886 A1 * | 1/2004 | Oda | ......................... | H04L 63/10 455/422.1 |
| 2004/0125813 A1 * | 7/2004 | Tanaka | .................... | H04L 12/66 370/401 |

(Continued)

FOREIGN PATENT DOCUMENTS

| CN | 1481117 | 3/2004 |
|---|---|---|
| CN | 1481119 | 3/2004 |

(Continued)

OTHER PUBLICATIONS

"Office Action of China Counterpart Application" with English translation thereof, issued on Oct. 8, 2016, p. 1-p. 20.

(Continued)

*Primary Examiner* — Moustafa M Meky
*Assistant Examiner* — Sm Z Islam
(74) *Attorney, Agent, or Firm* — Jianq Chyun IP Office (57) ABSTRACT

A method, an apparatus, and a system for remotely controlling an electronic apparatus are provided. In the method, a control apparatus discovers at least one response apparatus in the same network and obtains an apparatus description of each response apparatus. According to a command list in the apparatus description, the control apparatus sends a control message requesting a service in the command list to the response apparatus, so as to control the response apparatus to execute an operation corresponding to the control message. Here, the command list records a plurality of services provided by the response apparatus.

19 Claims, 3 Drawing Sheets

(56) References Cited

U.S. PATENT DOCUMENTS

2005/0251549 A1* 11/2005 Hlasny ............... H04L 12/2803
709/203
2007/0086463 A1* 4/2007 Ko .................... H04L 29/12301
370/392
2011/0130143 A1* 6/2011 Mori .................... H04W 24/02
455/436

FOREIGN PATENT DOCUMENTS

| CN | 1481122 | 3/2004 |
| CN | 1630260 | 6/2005 |
| EP | 1545064 | 6/2010 |
| TW | I234947 | 6/2005 |

OTHER PUBLICATIONS

"Office Action of Taiwan Counterpart Application", issued on Apr. 10, 2015, p. 1-p. 18.

* cited by examiner

METHOD, APPARATUS AND SYSTEM FOR REMOTELY CONTROLLING ELECTRONIC APPARATUS

CROSS-REFERENCE TO RELATED APPLICATION

This application claims the priority benefit of China application serial no. 201310039507.3, filed on Jan. 31, 2013. The entirety of the above-mentioned patent application is hereby incorporated by reference herein and made a part of this specification.

BACKGROUND OF THE INVENTION

Field of the Invention

The invention generally relates to a remote control method and a remote control apparatus; more particularly, the invention relates to a method, an apparatus, and a system for remotely controlling an electronic apparatus.

Description of Related Art

An interactive response system (IRS) is a teaching system that empowers a teacher to manage students to contribute to a classroom discussion and opinion feedback. The IRS provides each student with a response apparatus as well as provides the teacher with an exclusive controller, such that the teacher may utilize the controller to raise questions, hold pop quiz sessions, or teach other interactive lessons anytime during his or her lecture.

Specifically, the IRS may be applied together with computers and displays (or projectors) in the classroom and may enable the teacher to develop multiple choice style questions in the computers in advance, present the questions on the displays, and direct the students to answer the questions by pressing buttons on the response apparatuses. The system then gathers the answers from all of the response apparatuses and visualizes the answers on the displays in form of graphics or lists. Thereby, the students can participate in group discussions and may further interact and communicate with one another.

Along with the thriving development of information technology (IT), the performance of the IRS may be optimized if wireless apparatuses (e.g., cell phones, tablet computers, and so forth) serve as the response apparatuses. As such, the teacher during his or her lecture may obtain statistical results regarding the responses from the students, estimate the response proportion, monitor the learning conditions of each student, and adjust the pace of instruction at any time.

SUMMARY OF THE INVENTION

The invention is directed to a remote control method of an electronic apparatus, an apparatus applying the method, and a system applying the method. Particularly, a control apparatus is employed to gather services provided by each response apparatus in the same network, so as to control the response apparatus to execute certain operations.

In an exemplary embodiment of the invention, a method for remotely controlling an electronic apparatus is provided, and the method is suitable for a control apparatus to control at least one response apparatus to execute an operation. In the method, a control apparatus discovers at least one response apparatus in the same network and obtains an apparatus description of each response apparatus. According to a command list in the apparatus description, the control apparatus sends a control message requesting a service in the command list to the response apparatus, so as to control the response apparatus to execute an operation corresponding to the control message. Here, the command list records a plurality of services provided by the response apparatus.

According to an exemplary embodiment of the invention, the step of discovering the response apparatus in the same network includes broadcasting a search message, receiving an inspection message sent by each response apparatus in response to the search message, and establishing a data connection to the corresponding response apparatus according to an IP address in the inspection message.

According to an exemplary embodiment of the invention, the step of obtaining the apparatus description of each response apparatus includes obtaining a web address of the apparatus description from the inspection message and obtaining the apparatus description from the web address.

According to an exemplary embodiment of the invention, the step of discovering the response apparatus in the same network includes listening an alive message cyclically sent by each response apparatus and establishing a data connection to the corresponding response apparatus according to an IP address in the alive message if the alive message is listened.

According to an exemplary embodiment of the invention, the step of obtaining the apparatus description of each response apparatus includes obtaining a web address of the apparatus description from the alive message and obtaining the apparatus description from the web address.

According to an exemplary embodiment of the invention, after obtaining the apparatus description of each response apparatus, the method further displays the services recorded by the command list in the apparatus description and receive an operation of selecting one of the services, so as to send the control message requesting the selected service to the response apparatus.

According to an exemplary embodiment of the invention, in the method, after the control message requesting the selected service in the command list is sent to the response apparatus, the response apparatus further executes the selected service requested by the control message, changes a status of the selected service, and reports the status to the control apparatus.

In an exemplary embodiment of the invention, a control apparatus that supports remote control includes a discovery module, a description obtaining module, and a command transmission module. The discovery module discovers at least one response apparatus in a same network. The description obtaining module obtains an apparatus description of each response apparatus. According to a command list in the apparatus description, the command transmission module sends a control message requesting a service in the command list to the response apparatus, so as to control the response apparatus to execute an operation corresponding to the control message. Here, the command list records a plurality of services provided by the response apparatus.

According to an exemplary embodiment of the invention, the discovery module broadcasts a search message, receives an inspection message sent by each response apparatus in response to the search message, and establishes a data connection to the corresponding response apparatus according to an IP address in the inspection message.

According to an exemplary embodiment of the invention, the discovery module obtains a web address of the apparatus description from the inspection message and obtains the apparatus description from the web address.

According to an exemplary embodiment of the invention, the discovery module listens an alive message cyclically sent by each response apparatus, and if the discovery module listens the alive message, the discovery module establishes a data connection to the corresponding response apparatus according to an IP address in the alive message.

According to an exemplary embodiment of the invention, the discovery module obtains a web address of the apparatus description from the alive message and obtains the apparatus description from the web address.

According to an exemplary embodiment of the invention, the control apparatus further includes a management module that displays the services recorded by the command list in the apparatus description on an apparatus management page and receives an operation of selecting one of the services, so as to send the control message requesting the selected service to the response apparatus through the command transmission module.

In an exemplary embodiment of the invention, a response apparatus that supports remote control includes a discovery module, a description providing module, and a command executing module. The discovery module discovers a control apparatus in a same network. The description providing module provides an apparatus description to the control apparatus. Here, the apparatus description includes a command list that records a plurality of services provided by the response apparatus. The command executing module receives a control message requesting one of the services from the control apparatus and executes an operation corresponding to the control message.

According to an exemplary embodiment of the invention, the discovery module receives a search message broadcasted by the control apparatus and sends an inspection message including an IP address to the control apparatus in response to the search message.

According to an exemplary embodiment of the invention, the discovery module sends an alive message including an IP address to the network cyclically, such that the control apparatus establishes a data connection to the response apparatus according to the IP address.

In an exemplary embodiment of the invention, a remote control system includes at least one response apparatus and a control apparatus. Each response apparatus is connected to a network and provides an apparatus description through the network. Here, the apparatus description includes a command list that records a plurality of services provided by the response apparatus. The control apparatus discovers the response apparatus through the network and obtains the apparatus description of each response apparatus. According to the command list in the apparatus description, the control apparatus sends a control message requesting one of the services in the command list to the response apparatus, so as to control the response apparatus to execute an operation corresponding to the control message.

According to an exemplary embodiment of the invention, the control apparatus broadcasts a search message through the network, receives an inspection message sent by each response apparatus in response to the search message, and establishes a data connection to the corresponding response apparatus according to an IP address in the inspection message.

According to an exemplary embodiment of the invention, the response apparatus cyclically sends an alive message including an IP address to the network. The control apparatus listens the alive message cyclically sent by each response apparatus through the network. If the control apparatus listens the alive message, the control apparatus establishes a data connection to the corresponding response apparatus according to an IP address in the alive message.

In view of the above, the remote control method of the electronic apparatus, the apparatus applying the method, and the system applying the method allow the control apparatus to search and discover the response apparatuses in the same network as well as gather the services provided by each response apparatus in the same network according to a universal plug-and-play (UPNP) protocol. After the control apparatus selects one of the services and sends a corresponding control message to the response apparatus, the response apparatus is controlled to execute specific operations, such as lock or unlock the screen. Thereby, it is likely to control the response apparatus without interfering with the operations of the response apparatus.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

In the invention, a control apparatus configured at a teacher's end acts as a central node to which all response apparatuses in the same network may be connected through the network, and thereby a resultant tree-like structure capable of transmitting messages in a one-to-many manner may be formed. In the structure, the control apparatus acting as the central node may execute operations such as screen lock, screen sharing, or student information management on all of the response apparatuses. Thereby, the teacher is able to monitor the progress of his or her lecture and enlighten the students thinking.

Figure 1:
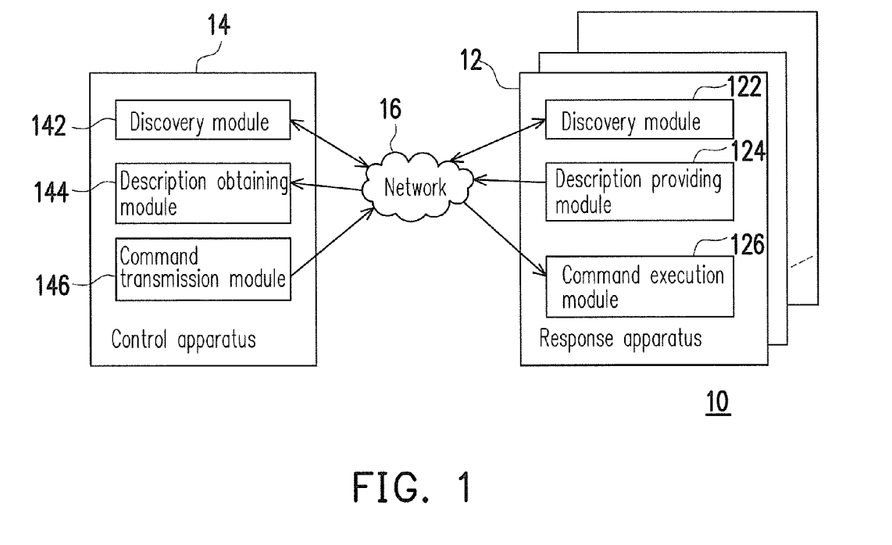
FIG. 1 is a schematic view illustrating a remote control system according to an embodiment of the invention.

FIG. 1 is a schematic view illustrating a remote control system according to an embodiment of the invention. With reference to FIG. 1, the remote control system 10 described in the present embodiment includes at least one response apparatus 12 and a control apparatus 14. The response apparatus 12 and the control apparatus 14 are, for instance, desktop computers, notebook computers, tablet computers, cell phones, personal digital assistants (PDAs), and other electronic apparatuses which have basic internet connection and computation capabilities to achieve the remote control function described herein. The response apparatus 12 includes a discovery module 122, a description providing module 124, and a command executing module 126. By applying an exemplary UPnP technology, the response apparatus 12 may be connected to the network 16 through a wired transmission interface (e.g., phone cable, power cable, Ethernet Firewire, etc.) or a wireless transmission interface (e.g., infrared, wireless fidelity (Wi-Fi), Bluetooth, radio, etc.), for instance. Each response apparatus 12 records the apparatus description (i.e., the UPnP description) with use of an eXtensible Markup Language (XML), for instance. The apparatus description includes a uniform resource locater (URL, i.e., a web address) that records the brand, the model number, the serial number, the manufacturer's name, and other relevant information of the response apparatus 12, such that an external apparatus is able to obtain the required apparatus description via the web address. The apparatus description further includes a command list recording services that can be provided by the response apparatus 12 and the parameters for executing various commands. These parameters describe the status message of the response apparatus 12 in execution.

The control apparatus 14 includes a discovery module 142, a description obtaining module 144, and a command transmission module 146. Similar to the response apparatus 12, the control apparatus 14 is connected to the network 16 by applying the UPnP technology and searches the online response apparatuses 12 through the network 16 so as to execute apparatus matching. In addition, the control apparatus 14 issues commands to the response apparatus 12 through an apparatus management page, so as to control the response apparatus 12 to lock or unlock the screen or to execute other operations.

Figure 2:
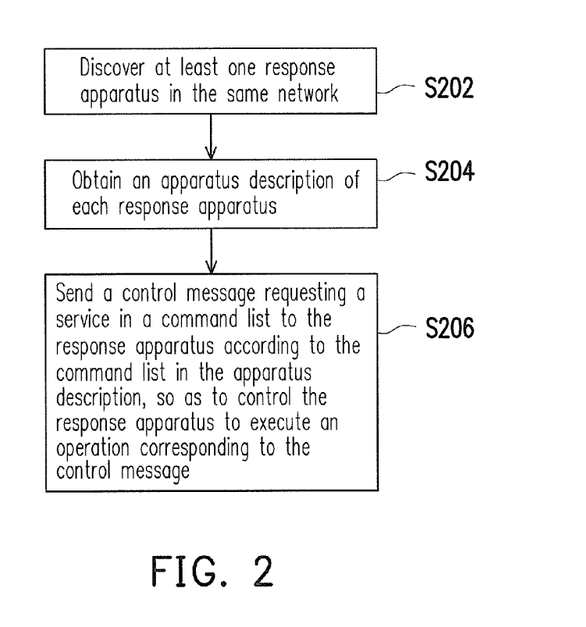
FIG. 2 is a flowchart illustrating a remote control method according to an embodiment of the invention.

FIG. 2 is a flowchart illustrating a remote control method according to an embodiment of the invention. With reference to FIG. 1 and FIG. 2, the remote control method described in the present embodiment is applicable to the remote control system 10 depicted in FIG. 1, and the detailed steps of the remote control method are explained hereinafter with reference to various devices in the remote control system 10.

The control apparatus 14 discovers each response apparatus 12 in the same network 16 through the discovery module 142 (step S202). In particular, the control apparatus 14 searches the response apparatus 12 in the network 16 by means of a simple service discovery protocol (SSDP) defined in the UPnP, and the response apparatus 12 also discovers the control apparatus 14 in the same network 16 through the discovery module 142. The message exchanged between the control apparatus 14 and the response apparatus 12 is the discovery message that includes information relevant to the response apparatus 12 itself and information of services provided by the response apparatus 12.

The control apparatus 14 obtains the apparatus description of each response apparatus 12 through the description providing module 142 (step S204), and the apparatus description is provided by the description providing module 142 of the response apparatus 12, for instance. Specifically, after the control apparatus 14 discovers a response apparatus 12, the control apparatus 14 further obtains the apparatus description from the message provided by the response apparatus 12 and learns the specification of the response apparatus 12 as well as the services that can be provided by the response apparatus 12 in order to understand the functions of the response apparatus 12 or interact with the response apparatus 12.

According to the UPnP protocol, as long as one response apparatus 12 joins the network 16, the UPnP protocol allows the joined response apparatus 12 to broadcast its services to the control apparatus 14. Similarly, as long as one control apparatus 14 joins the network 16, the control apparatus 14 is able to search and discover the existing response apparatus 12 as well as the information relevant to such response apparatus 12. Said step is referred to as a discovery step in the UPnP protocol. As discussed above, the discovery step between the response apparatus 12 and the control apparatus 14 may be categorized into two sub-steps: the control apparatus 14 may actively send a search message to "discover" the response apparatus 12 according to the response of the response apparatus 12; the response apparatus 12 may cyclically send an alive message to be discovered by the control apparatus 14. Each sub-step is elaborated in one of the following embodiments.

Figure 3:
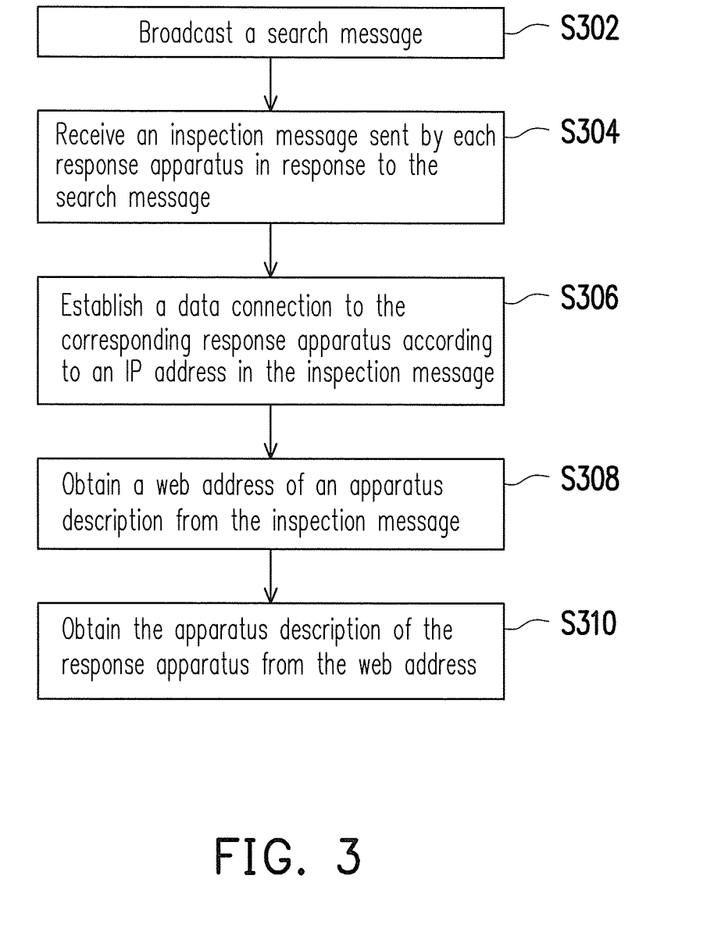
FIG. 3 is a flowchart illustrating a method of obtaining an apparatus description according to an embodiment of the invention.

As to the active search initiated by the control apparatus 14, please refer to FIG. 3, which is a flowchart illustrating a method of obtaining an apparatus description according to an embodiment of the invention. With reference to FIG. 1 and FIG. 3, the remote control method described in the present embodiment is applicable to the remote control system 10 depicted in FIG. 1, and the detailed steps of the method of obtaining the apparatus description are explained hereinafter with reference to various devices in the remote control system 10.

The control apparatus 14 broadcasts a search message over the network 16 through the discovery module 142 (step 5302) and receives an inspection message sent by each response apparatus 12 in response to the search message (step S304). Here, the inspection message sent by the response apparatus 12 includes its internet protocol (IP) address. According to the IP address, the discovery module 142 of the control apparatus 14 is able to communicate with and establish a data connection to the discovery module 122 of the response apparatus 12 (step S306). The description obtaining module 144 of the control apparatus 14 obtains a web address of the apparatus description from the inspection message (step S308) and obtains the apparatus description of the response apparatus 12 from the web address (step S310).

Figure 4:
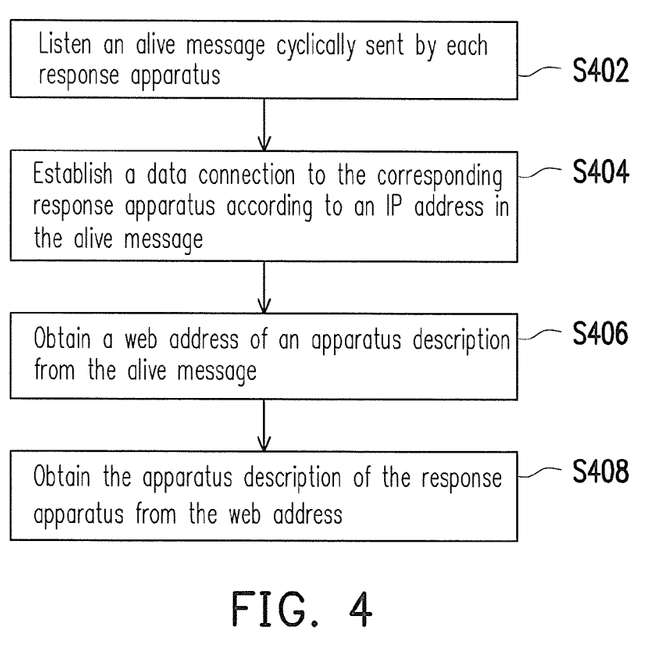
FIG. 4 is a flowchart illustrating a method of obtaining an apparatus description according to an embodiment of the invention.

As to the alive message sent by the response apparatus 12, please refer to FIG. 4, which is a flowchart illustrating a method of obtaining an apparatus description according to an embodiment of the invention. With reference to FIG. 1 and FIG. 4, the remote control method described in the present embodiment is applicable to the remote control system 10 depicted in FIG. 1, and the detailed steps of the method of obtaining the apparatus description are explained hereinafter with reference to various devices in the remote control system 10.

The discovery module 142 of the control apparatus 14 listens an alive message cyclically sent by the discovery module 122 of each response apparatus 12 over the network 16 (step S402). Here, the alive message includes the IP address of the response apparatus 12 and indicates the online status of the response apparatus 12. As long as the discovery module 142 of the control apparatus 14 listens the alive message, the discovery module 142 communicates with and establish a data connection to the discovery module 122 of the response apparatus 12 according to the IP address recorded in the alive message (step S404). The description obtaining module 144 of the control apparatus 14 may also obtain a web address of the apparatus description from the alive message (step 5406) and thereby obtain the apparatus description of the response apparatus 12 from the web address (step S408).

In view of the foregoing, the control apparatus 14 not only can discover all of the response apparatuses 12 connected to the network 16 but also may learn the services provided by each of the response apparatuses 12 according to the apparatus description of each response apparatus 12 and subsequently control the response apparatuses 12.

Particularly, as shown in FIG. 2, the command transmission module 146 of the control apparatus 14 sends a control message requesting a service in the command list to the response apparatus 12 according to the command list in the apparatus description, so as to control the response apparatus 12 to execute an operation corresponding to the control message (step S206). Here, the control message is described by means of XML according to a simple object access protocol (SOAP). Besides, the command list records a plurality of services provided by the response apparatus 12, e.g., lock/unlock the screen, certain buttons (e.g., a home button, a back button, a search button, a volume button, etc.), or certain columns (e.g., a status column, a navigation column, etc.) of the response apparatus 12.

It is noted herein that the control apparatus 14, after obtaining the apparatus description of each response apparatus 12, may display the services recorded by the command list in the apparatus description on an apparatus management page through a management module (not shown), so that a user of the control apparatus 14 may make selections from the apparatus management page and thereby control and operate the response apparatus 12. When the user selects one of the services, the management module of the control apparatus 14 sends the control message requesting the selected service to the response apparatus 12 through the command transmission module 146, so as to control the response apparatus 12 to perform the selected service. After the response apparatus 12 receives the control message, the command executing module 126 executes an operation corresponding to the control message requesting one of the services and reports the execution result to the control apparatus 14.

Figure 5:
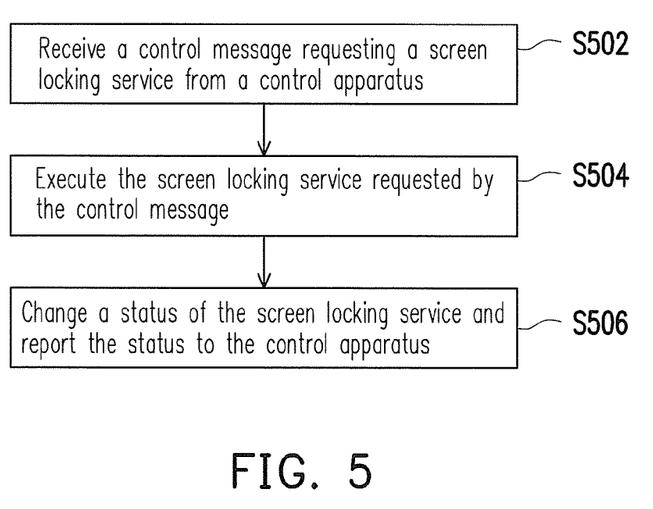
FIG. 5 is a flowchart illustrating a method for a response apparatus to provide a service according to an embodiment of the invention.

FIG. 5 is a flowchart illustrating a method for a response apparatus to provide a service according to an embodiment of the invention. With reference to FIG. 5, the exemplary screen locking service provided in the present embodiment serves to explain the detailed steps of the response apparatus executing the service requested by the control apparatus.

The response apparatus receives the control message requesting the screen locking service from the control apparatus (step S502) and thereby executes the screen locking service requested by the control message (step S504). The response apparatus may check whether the screen locking service is executed or not (i.e., check the status of the screen). If the screen is locked, the response apparatus reports the locked status to the control apparatus; if the screen is not locked, after the screen locking service is executed, the response apparatus changes the status of the screen to the locked status and reports the same to the control apparatus (step S506), so as to complete the execution of the service.

To sum up, when the method, the apparatus, and the system for remotely controlling the electronic apparatus described herein are applied to an IRS, the teacher is allowed to send the control message requesting a service to the designated response apparatus, and thus the teacher is able to lock/unlock the response apparatus or perform other functions on the response apparatus. Through such a "backstage" service of listening the control message to control the response apparatus, the response apparatus may be controlled without interrupting the user who currently operates the response apparatus. Moreover, if necessary, the control apparatus is allowed to perform the unlocking service or resume the operation before screen locking on all of the response apparatuses immediately, rapidly, and accurately.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A method for remotely controlling an electronic apparatus, adapted to a control apparatus controlling at least one response apparatus to execute an operation, comprising:
    discovering the at least one response apparatus in a same network;
    obtaining an apparatus description of each of the at least one response apparatus;
    according to a command list in the apparatus description, sending a control message requesting a service in the command list to each of the at least one response apparatus, so as to control the response apparatus to execute the operation corresponding to the control message, wherein the command list records a plurality of services provided by the response apparatus;
    checking whether the service is executed by the at least one response apparatus;
    reporting a status of the service being executed to the control apparatus by the at least one response apparatus if the service is executed; and
    executing the service, changing the status of the service and reporting the status to the control apparatus by the at least one response apparatus if the service is not executed.

2. The method as recited in claim 1, wherein the step of discovering the at least one response apparatus in the same network comprises:
    broadcasting a search message;
    receiving an inspection message sent by each of the at least one response apparatus in response to the search message; and
    establishing a data connection to a corresponding response apparatus of the at least one response apparatus according to an IP address in the inspection message.

3. The method as recited in claim 2, wherein the step of obtaining the apparatus description of each of the at least one response apparatus comprises:
    obtaining a web address of the apparatus description from the inspection message; and
    obtaining the apparatus description from the web address.

4. The method as recited in claim 1, wherein the step of discovering the at least one response apparatus in the same network comprises:
    listening an alive message cyclically sent by each of the at least one response apparatus; and
    if the alive message is listened, establishing a data connection to a corresponding response apparatus of the at least one response apparatus according to an IP address in the alive message.

5. The method as recited in claim 4, wherein the step of obtaining the apparatus description of each of the at least one response apparatus comprises:
    obtaining a web address of the apparatus description from the alive message; and
    obtaining the apparatus description from the web address.

6. The method as recited in claim 1, after obtaining the apparatus description of each of the at least one response apparatus, the method further comprising:
    displaying the services recorded by the command list in the apparatus description; and receiving an operation of selecting one of the services, so as to send the control message requesting the selected service to the response apparatus.

7. A control apparatus supporting remote control and comprising:
   a discovery module, configured to discover at least one response apparatus in a same network;
   a description obtaining module, configured to obtain an apparatus description of each of the at least one response apparatus; and
   a command transmission module, configured to send a control message requesting a service in the command list in the apparatus description to the at least one response apparatus, so as to control the at least one response apparatus to execute an operation corresponding to the control message, wherein the command list records a plurality of services provided by the at least one response apparatus, wherein
   after the control message requesting the selected service in the command list is sent to the at least one response apparatus, the at least one response apparatus checks whether the service is executed, reports a status of the service being executed to the control apparatus if the service is executed, and executes the service, changes the status of the service and reports the status to the control apparatus if the service is not executed.

8. The control apparatus as recited in claim 7, wherein the discovery module further broadcasts a search message, receives an inspection message sent by each of the at least one response apparatus in response to the search message, and establishes a data connection to a corresponding response apparatus of the at least one response apparatus according to an IP address in the inspection message.

9. The control apparatus as recited in claim 8, wherein the discovery module further obtains a web address of the apparatus description from the inspection message and obtains the apparatus description from the web address.

10. The control apparatus as recited in claim 7, wherein the discovery module further listens an alive message cyclically sent by each of the at least one response apparatus, and if the discovery module listens the alive message, the discovery module establishes a data connection to a corresponding response apparatus of the at least one response apparatus according to an IP address in the alive message.

11. The control apparatus as recited in claim 10, wherein the discovery module further obtains a web address of the apparatus description from the alive message and obtains the apparatus description from the web address.

12. The control apparatus as recited in claim 7, further comprising:
   a management module, configured to display the services recorded by the command list in the apparatus description on an apparatus management page and receive an operation of selecting one of the services, so as to send the control message requesting the selected service to the response apparatus through the command transmission module.

13. A response apparatus supporting remote control and comprising:
   a discovery module, configured to discover a control apparatus in a same network;
   a description providing module, configured to provide an apparatus description to the control apparatus, wherein the apparatus description comprises a command list recording a plurality of services provided by the response apparatus; and
   a command executing module, configured to receive a control message requesting one of the services from the control apparatus and execute an operation corresponding to the control message, wherein
   after the response apparatus receives the control message requesting the selected service in the command list from the control apparatus, the response apparatus checks whether the service is executed, reports a status of the service being executed to the control apparatus if the service is executed, and executes the service, changes the status of the service and reports the status to the control apparatus if the service is not executed.

14. The response apparatus as recited in claim 13, wherein the discovery module further receives a search message broadcast by the control apparatus and sends an inspection message comprising an IP address to the control apparatus in response to the search message.

15. The response apparatus as recited in claim 13, wherein the discovery module further sends an alive message comprising an IP address to the network cyclically, such that the control apparatus establishes a data connection to the response apparatus according to the IP address.

16. A remote control system comprising:
   at least one response apparatus, each of the at least one response apparatus being connected to a network and configured to provide an apparatus description through the network, wherein the apparatus description comprises a command list recording a plurality of services provided by the at least one response apparatus; and
   a control apparatus, configured to discover the at least one response apparatus through the network, obtain the apparatus description of each of the at least one response apparatus, and send a control message requesting one of the services in the command list in the apparatus description to the at least one response apparatus, so as to control the at least one response apparatus to execute an operation corresponding to the control message, wherein
   after the control message requesting the selected service in the command list is sent to the at least one response apparatus, the at least one response apparatus checks whether the service is executed, reports a status of the service being executed to the control apparatus if the service is executed, and executes the service, changes the status of the service and reports the status to the control apparatus if the service is not executed.

17. The remote control system as recited in claim 16, wherein the control apparatus further broadcasts a search message through the network, receives an inspection message sent by each of the at least one response apparatus in response to the search message, and establishes a data connection to a corresponding response apparatus of the at least one response apparatus according to an IP address in the inspection message.

18. The remote control system as recited in claim 16, wherein the at least one response apparatus further sends an alive message comprising an IP address to the network cyclically.

19. The remote control system as recited in claim 18, wherein the control apparatus listens the alive message cyclically sent by each of the at least one response apparatus through the network, and if the at least one response apparatus listens the alive message, the control apparatus establishes a data connection to a corresponding response apparatus of the at least one response apparatus according to an IP address in the alive message.

* * * * *